United States Patent
Suiter

(10) Patent No.: US 6,690,299 B1
(45) Date of Patent: Feb. 10, 2004

(54) PRIMARY FLIGHT DISPLAY WITH TACTICAL 3-D DISPLAY INCLUDING THREE VIEW SLICES

(75) Inventor: James M. Suiter, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/005,937

(22) Filed: Jan. 12, 1998

(51) Int. Cl.[7] .............................................. G01C 23/00
(52) U.S. Cl. ...................... 340/973; 340/974; 340/975
(58) Field of Search .................................. 340/973, 974, 340/975, 976, 977, 978, 979, 951, 955, 967, 971, 961; 342/29, 33; 345/427, 428, 6

(56) References Cited

U.S. PATENT DOCUMENTS

| | | | | |
|---|---|---|---|---|
| 4,283,705 A | * | 8/1981 | James et al. ................. 340/973 |
| 5,111,400 A | * | 5/1992 | Yoder ...................... 364/424.01 |
| 5,136,301 A | * | 8/1992 | Bechtold et al. ............. 342/176 |
| 5,343,395 A | * | 8/1994 | Watts ......................... 364/428 |
| 5,420,582 A | * | 5/1995 | Kubbat et al. ............... 340/974 |
| 5,798,713 A | * | 8/1998 | Viebahn et al. ............. 340/974 |
| 5,920,321 A | * | 7/1999 | Owen et al. ................. 345/427 |

OTHER PUBLICATIONS

Commuter World, pp. 16, 18–21, Jan. 1997.*

* cited by examiner

*Primary Examiner*—Daniel J. Wu
*Assistant Examiner*—Toan Pham
(74) *Attorney, Agent, or Firm*—Nathan O. Jensen; Kyle Eppele

(57) ABSTRACT

A primary flight display with three-dimensional capability provides information in an intuitive format for enhanced situational awareness. The display also includes other navigational data such as airspeed, attitude, altitude, and heading. The display may also include three view slices, a pictorial autopilot status indicator, vertical and lateral deviation and deviation history, glide slope and localizer information, airport and runway information, past position history of the aircraft and other nearby aircraft. The display may depict potential threats to the aircraft such as terrain or other manmade obstacles, nearby aircraft, severe weather thus increasing situational awareness with respect thereto. In a preferred embodiment, the three dimensional tactical map is implemented as a frequency separated display.

20 Claims, 3 Drawing Sheets

PRIMARY FLIGHT DISPLAY WITH TACTICAL 3-D DISPLAY INCLUDING THREE VIEW SLICES

BACKGROUND OF THE INVENTION

The present invention relates generally to a primary flight display (PFD) for aircraft and, more particularly, to a primary flight display incorporating a three-dimensional tactical display. Despite the great potential for reduction of pilot workload and error that comes with increasingly automated aircraft navigation, the human-machine interface in current flight management systems continues to be an obstacle in reaching this potential that automation technology provides.

The advent of advanced technology aircraft and flight deck automation may reduce the number of functions a flight crew is actively or directly involved in, however, the crew's responsibility for correct and timely performance of those activities is not reduced. Where advanced automation facilitates a reduction in crew size, the crew's oversight of cockpit activities may become more difficult as many concurrent activities are performed and monitored by a fewer number of people.

One potential side effect of flight deck automation is flight crew inactivity, fatigue, or complacency. When automation functions reliably, as it does most of the time, it may induce pilots to be less alert in monitoring aircraft behavior and less prepared to take immediate action when needed.

Another problem with flight deck design is that it may lack a human-centered design philosophy that addresses the capabilities and limitations of humans, and the proper role and function of the human in piloting advanced technology aircraft.

Aircraft monitoring may be necessary for long periods of time and the crew may be required to integrate and assimilate information spread over several parts of the interface. In some cases, crew workload may be high at certain times and low at others, possibly resulting in periods of excessive workload followed by periods of boredom. The combination of large amounts of information and poor formatting or integration may serve to increase crew workload.

A weak link in the present system is the human-machine interface, especially that of the flight management system (FMS), which is the system through which most new datalink technologies will work. As currently designed, the FMS has several weaknesses. For example, it is difficult to program, and it is not always apparent to one pilot what inputs another pilot has made. As an integral part of the aircraft operating system in advanced technology aircraft, it cannot be ignored by the pilot, generates large amounts of work at times of high pilot work load (e.g., as with a system failure or late runway change), and data are not always displayed clearly.

Depending on the type of pilot input, the only type of immediate feedback available may be an alphabetical or numerical change on the control display unit.

As an example, the pilot may enter by typing in an altitude for the crossing of a fix near the destination airport. In the extreme case of a very long flight, the delay between the pilot action and the change in aircraft altitude may be more than ten hours. Thus, the pilot must not only have knowledge of the current state of the aircraft, but also of the future programmed states that the aircraft will achieve.

It would therefore be desirable to depict such information regarding the present and future states of the aircraft in a manner that is intuitive and readily recognizable by all members of the flight crew. Particularly useful in achieving this goal would be the use of a graphical or pictorial interface, and even more particularly, a three-dimensional graphical interface. Although flight management system three-dimensional plan maps provide a very compelling display, such are planning tools for strategic purposes, and not for primary flight displays. Thus, it would be desirable to provide improved three-dimensional display for tactical use.

It is, therefore, an object of the present invention to provide an improved three dimensional flight display that is suitable for not only flight planning, but also for tactical use during flight as an integrated component of a primary flight display.

Situational awareness, procedural, and tactical decision-making are the dominant crew errors in accidents. Virtually all approach-to-landing phase accidents involve situational awareness problems. Such findings reinforce those of researchers over the last 40 years. U.S. Navy Capt. George Hoover (Ret.), a pioneer in aviation human factors who has campaigned relentlessly for cockpit displays based on graphical rather than alphanumeric information, is convinced that many situational awareness related accidents could be prevented by improved instrumentation. In *Aviation Week and Space Technology* (Jun. 17, 1996), he states that "People would rather have data presented to them in pictures instead of, symbols. Humans interpret graphical information faster, process it more efficiently and make fewer mistakes when applying it."

Situational awareness, which depends upon how well the pilot is provided with information relative to the current surroundings, such as other aircraft or threats in the immediate area, will become more important in the near future when the Air Traffic Control (ATC) system changes to the Air Traffic Management system. Pilots will have more responsibility for their flight trajectory since they will often be in control rather than the ATC. A good awareness of this trajectory into the future is important. "Free flight" envisions an aircraft flying any trajectory with intermittent ATC control when conflicts occur. In Europe, the scheme envisioned is for an air crew to request a flight path, which is then approved by ground controllers, and then fly that trajectory under continuous positive ATC control.

In either case, the pilot will be much more responsible for and creative in determining his or her flight path and trajectory for a given flight. It would, therefore, be desirable to provide a three-dimensional map that provides immediate and future situational awareness.

It is, therefore, another object of the present invention to provide a primary flight display with data presented in a three-dimensional format that provides a flight crew with highly increased situational awareness, thus enhancing a flight crew's ability to compensate and correct for flight path errors.

The display according to the present invention is integral to providing an interface that is easy to program and wherein inputs to the system are apparent to other members of the flight crew are pictorially displayed, both in terms of the data entered by the aircrew and the flight management system actions to be taken as a result of the data entry, both immediate and in the future. The display format in accordance with the present invention is useful under the current system of airways or "highways in the sky" by allowing pilots to determine whether flight automation is correctly programmed to maintain proper heading, altitude, according to the flight plan, or instrument landing system (ILS) parameters such as localizer and glide slope. The display according to the present invention will also meet the needs of the future by providing a human-machine interface that presents data conveniently, simply, and intuitively in a format that is easily assimilated and interpreted by a human operator, and that will be especially useful in allowing pilots to readily and intuitively evaluate if they have correctly programmed the automation for their intentions as more pilots assume more control over their flight trajectories.

SUMMARY OF THE INVENTION

The objects of the present invention are provided by a primary flight display with tactical three-dimensional display. The primary flight display according to the present invention combines a three-dimensional map with other navigation data including, inter alia, airspeed, attitude information, altitude, and heading information. The information is combined in an area that is concise, yet easy to read. The display format according to the present invention is most advantageously sized to be displayed on displays larger than 6 inch by eight inch display monitors, for example 8×10 inch or larger displays. However, it is also within the contemplation of the present invention that the display format be sized to be retrofitted on conventionally sized display monitors commonly found in flight decks, for example, six inch by eight inch display monitors.

In a preferred embodiment according to the present invention, the display format comprises an upper portion comprising an electronic depiction of conventional flight instrumentation and a lower portion comprising a three-dimensional map.

In an especially preferred embodiment according to the present invention, the display also incorporates vertical and lateral deviation and a top terrain view.

In addition, the display format according to the present invention can be used in conjunction with a Traffic Alert and Collision Avoidance System (TCAS) and systems designed to prevent Controlled Flight into Terrain (CFIT) such as the Ground Proximity Warning System (GPWS) and Ground Collision Avoidance System (GCAS).

BRIEF DESCRIPTION OF THE DRAWINGS

The invention will now be described by way of example only with reference to the accompanying drawings in which.

DETAILED DESCRIPTION OF THE INVENTION

Figure 1:
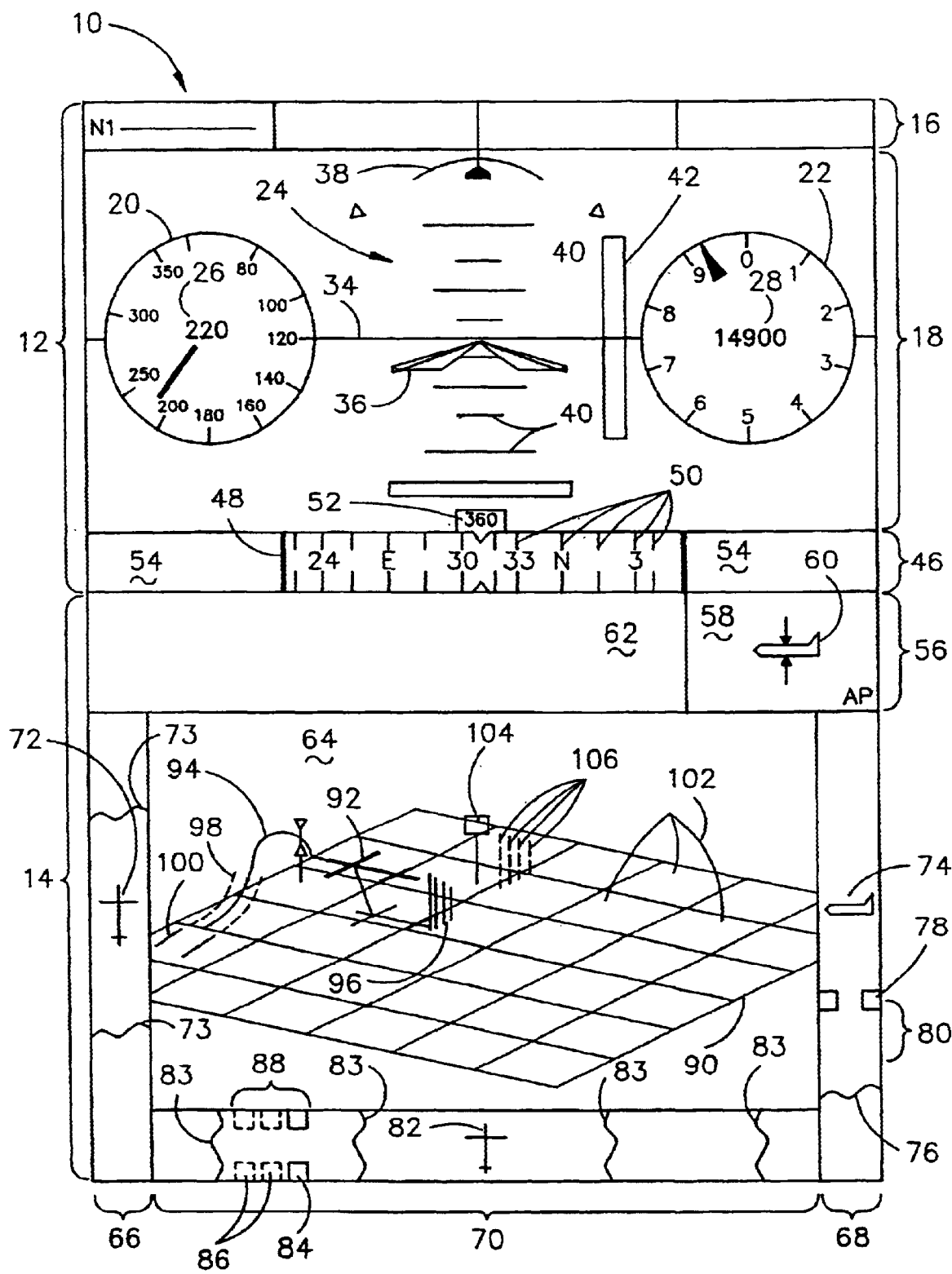
FIG. 1 shows one embodiment of the primary flight display having a three-dimensional tactical display according to the present invention.

FIG. 1 shows an exemplary PFD with three-dimensional tactical display 10 according to the present invention. PFD 10 will be discussed herein with reference to, upper section 12 and lower section 14.

In upper portion 12, there is depicted a thin uppermost portion 16 which may be used to display engine information, or the like. Examples of the type of data which may be displayed here includes, but is not limited to, engine data such as fuel, oil temperature or pressure, tachometer reading, carburetor heat indicator, landing gear indicator, flaps position indicator, spoiler indicator, magnetos indicator, navigation lights and red flashing tail beacon (strobe) indicator, clock, and the like. Also, task-oriented information may also be displayed in area 16.

Figure 2:
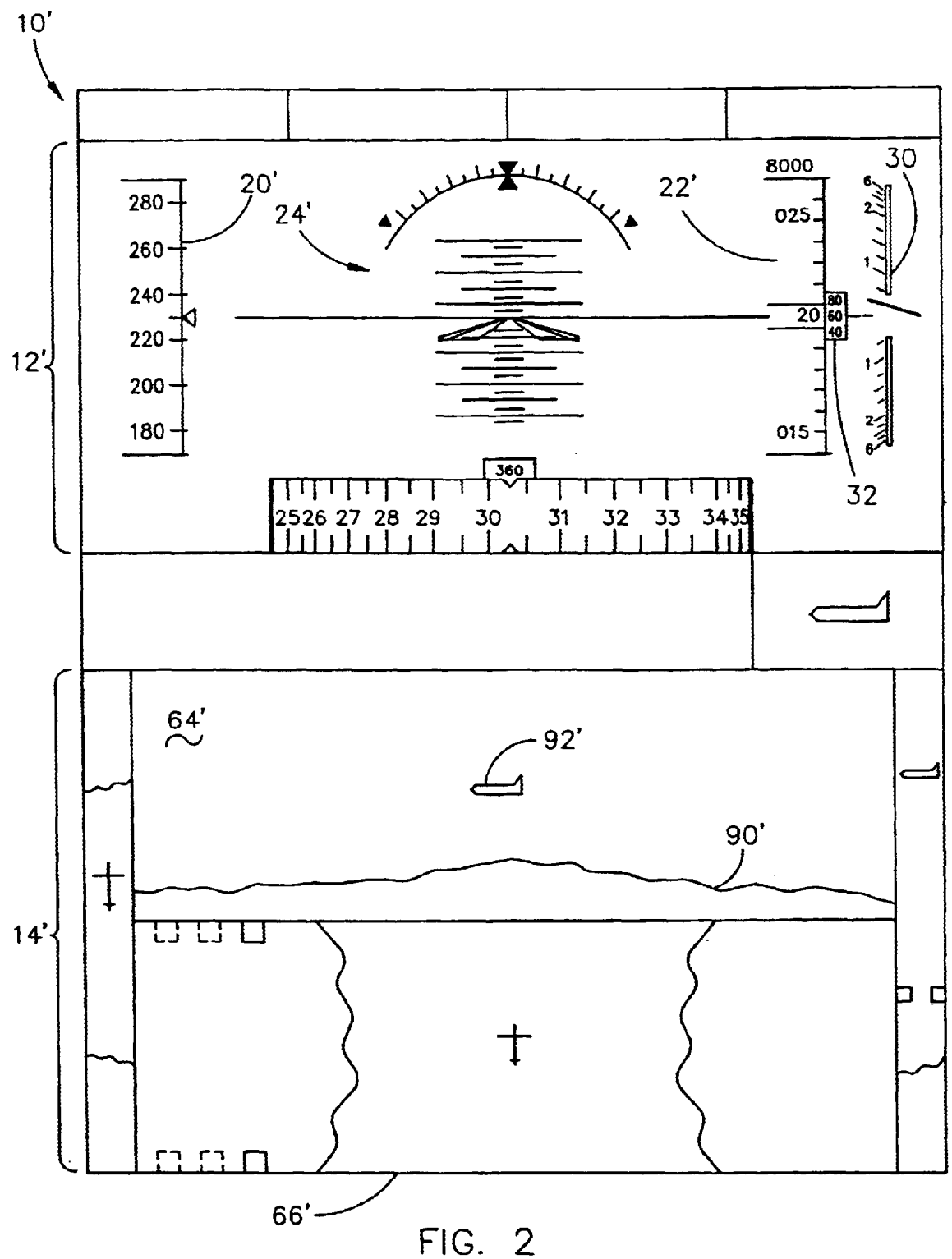
FIG. 2 shows an alternative embodiment of the primary flight display according to the present invention with altered instrumentation in the upper portion and wherein a two-dimensional mode is selected therein the three-dimensional map is replaced with enlarged top and side views.

Directly beneath portion 16 is portion 18 which is depicted in this embodiment as having airspeed indicator 20, altitude indicator 22, and attitude determination indicator 24. In FIG. 1, airspeed indicator 20 is of the dial type, and preferably further contains a digital readout 26 of the present airspeed. In FIG. 2, the airspeed indicator 20' is a vertical linear display, i.e., of the moving tape or rolling drum type whereby the scale shifts up or down such that the present value is always kept centered. Other data that may conveniently be presented in the area close to airspeed indicator 20 or 20' includes, for example, the selected air speed (not shown) which may be displayed as digits which may be directly entered by the pilot, and/or as a bug or marker on the dial or scale which is controllable or programmable by the pilot, the mach number (not shown), or the like.

Altitude indicator 22 is depicted in FIG. 1 as being of the dial type, and is shown with digital display 28 of the present altitude. FIG. 2 shows an alternative embodiment according to the present invention wherein the instrumentation indicators of upper section 12' are somewhat modified. For example, in FIG. 2, the altitude indicator 22' is a vertical linear display. Centrally located in area 14' is attitude indicator 24'. Also depicted in FIG. 2 is a vertical speed indicator 30. In the depicted embodiment, the vertical linear scale 22' further comprises a centrally located fine scale 32 in addition to the coarse scale depicted.

Other data that may be displayed in conjunction with altitude indicator 22 or 22' include, for example, selected altitude (not shown) which may be displayed as digits which may be directly entered by the pilot, and/or as a bug or marker on the dial or scale which is controllable or programmable by the pilot, barometric setting (not shown), or the like.

In an alternative embodiment (not shown) of FIG. 2, airspeed indicator 20' and altitude indicator 22' may comprise vertical scales wherein the scale graduations are expanded toward the center of the indicator displays and narrowed toward the upper and lower ends. In a preferred embodiment according to the present invention, the scale graduation spacing is made inversely proportional to the distance from the center, thereby giving the display a three-dimensional look of a portion of a rotating drum, and also solving the problem having both sufficient scale resolution in the most pertinent area of the scale (i.e., that corresponding the present state of the aircraft) and at the same time providing a sufficiently broad range of coarse scale display, and while at the same time reducing display area necessary and avoiding the need for a second scale or dial.

Centrally located in portion 18 between airspeed indicator 20 and altitude indicator 22 is an attitude indicator 24. Attitude indicator 24 comprises an artificial horizon indicated by line 34, aircraft reference symbol 36, roll or bank indicator 38, and pitch indicator ladder 40. The display background in the area of pitch indicator 40 is preferably differentially colored (not shown) above and below the artificial horizon 34.

The interstitial space in area 18 may also be used for additional instrument panel display indicia. For example, supplemental display area 42 may be used to indicate elevator position, elevator trim, throttle position, or the like. Similarly, supplemental display area 44 may be used for aileron position, rudder position, throttle position, or the like.

Still referring to upper portion 12 of PFD 10, there is located below portion 18 a compass portion 46. Compass display area 46 traverses the width of display 10 and contains therein a compass heading indicator 48. Heading indicator 48 is depicted as a horizontal linear scale of the moving tape or rotating drum type. It should be noted that compass scale graduations 50 of heading indicator 48 are spaced such that the scale is expanded in the center and compressed near the edges, thereby giving a three-dimensional effect similar to viewing a portion of a rotation drum or "automobile style" compass. Also depicted is pointer 52.

Heading indicator 48 may also have a selected heading display, i.e., as a controllable or programmable bug (not shown) if the heading desired to be selected is displayed within the range displayed, and/or may also be displayed in numerical format. Also, magnetic variation or calibration data (not shown) may likewise optionally be displayed.

In the particular embodiments depicted in FIGS. 1 and 2, the airspeed, attitude, altitude, and heading indicators are shown in a preferred arrangement in that such indicators are integrated into the three-dimensional PFD 10 while at the same time preserving the conventional "T" shape arrangement of these instruments. While many arrangements of the instruments in upper portion 12 are possible it is most advantageous that the T-shaped arrangement be retained. Retention of a conventional configuration in upper portion 12 serves to reduce the amount of retraining necessary and provides a familiar portion of the display for pilots to refer to as they always have, with information formatted in an expected, familiar fashion. Furthermore, the standard instruments are tuned for performance, in a human factors sense. In this manner, a PFD is provided which is beneficial in terms of both pilot performance and pilot situational awareness.

In an alternative embodiment, heading indicator 48 may optionally and/or selectively be replaced with a standard compass rose. For example, a partial compass rose may displayed, or when a three-dimensional view is not desired, heading indicator 48 may be programmable to depict a standard compass rose occupying some of lower portion 14.

Within section 46, to the left and right of heading indicator 48, are two blank areas 54. In a preferred embodiment, blank areas 54 are white to provide clear and distinct visual demarcation between upper portion 12 and lower portion 14.

Referring now to lower portion 14 of FIG. 1, there is shown an upper area 56, located directly beneath compass area 46. On the right side of area 56 there is an autopilot mode annunciation area 58 wherein the autopilot status is displayed by a graphical or pictorial symbol or icon 60 that shows what the autopilot is doing. In FIG. 1, for example, the symbol 60 shows a picture of an aircraft with an arrow above and below, thus depicting "altitude hold" mode, indicating that the autopilot is preventing the aircraft from ascending or descending. Supplemental annunciation area 62, to the left of autopilot mode annunciation area 58 is an additional annunciation area.

The dominant feature of lower portion 14 of PFD 10 is three-dimensional tactical map 64, shown in the depicted embodiment of FIG. 1 as being generally centrally located within lower portion 14. Three-dimensional tactical map 64 is bounded on the top by upper area 56, on the left by top view area 66, on the right by side view area 68, and on the bottom by an top view area 70.

Top view area 66 shows aircraft reference symbol 72 which may be superimposed over underlying terrain display indicia (not shown). Top view area is essentially a view of the aircraft and underlying terrain, in which terrain and other features along the current direction of flight of the aircraft may be displayed. Top view area 66 provides a pilot with information behind and in front of the aircraft and provides enhanced situational awareness of any potential threats to the aircraft based on present course heading.

The terrain in the vicinity of the aircraft may be determined by first determining the position of the aircraft and then displaying the corresponding terrain from a database, for example, a commercially available database such as a Jeppesen terrain database. Also preferably included in database are airports, VORs, NDBs, INTs, country, state, major city, and waterway boundaries, minimum safe altitudes, airspace classification information and prohibited, restricted, and warning areas or other special use airspace, highways, terrain elevations and other terrain markings, and other man-made or natural obstacles. The terrain may be color coded to depict elevation (either absolute elevation or elevation relative to the aircraft's altitude or projected altitude). For example, elevations which pose a threat of collision may be depicted in red, elevations which do not pose a threat of collision, but are within a predetermined range of elevations which do pose a threat of collision, may be depicted in yellow, and elevations which are in the range of elevations considered to be safely below the aircraft's altitude may be depicted in green. Bodies of water may be depicted in blue. Additionally, other landmarks, man-made obstacles, restricted air space, airports, and the like may also be depicted. In this manner, increased situational awareness of the underlying terrain is helpful in avoidance of potential CFIT conditions or other threats. This, of course, does not replace GCAS or GPWS, or other similar system, if present, but rather provides a situational awareness enhancement thereto.

Methods of position determination include navigational systems such as satellite based positioning systems such as GPS Precise Positioning Service (PPS), GPS Standard Positioning Service (SPS), Global Navigation Satellite System (GNSS), Global Orbiting Navigation Satellite System (GLOSNASS), GNSS-2, and the like; inertial devices; ground-based positioning systems such as LORAN, LORAN C, OMEGA, other radio navigation systems, and the like; terrain correlation systems or other terrain referenced navigation; radar correlation systems; deduced (de'd or "dead") reckoning; celestial position determination; and the like, or any combination of the above.

Side view area 68 depicts aircraft reference symbol 74, and may also contain a profile of underlying terrain 76, along the direction of flight. The aircraft's position and surrounding terrain calculations employed for the top view 66 may: similarly be used in side view display area 68. A color scheme similar to that used for the top view 66 may also preferably be used. Side view area 68 is also depicted with vertical deviation indicators 78, showing vertical deviation from the flight plan, glide slope, assigned altitude, or the like. Area 80 is reserved for vertical deviation history.

Top view area 70 depicts aircraft reference symbol 82 and is a top view of the of the aircraft and underlying terrain (not shown), and provides a pilot with situational awareness information to the sides of the aircraft. Lateral deviation indicator 84 shows lateral deviation from flight plan, localizer, or the like. Lateral deviation history is shown by indicators 86 in lateral deviation display area 88, wherein the earlier readings are faded (represented here by broken lines). The underlying terrain along the direction of flight of the aircraft may also optionally be depicted in a manner similar to terrain view as described above in reference to top view area 66.

In a preferred embodiment according to the present invention, a mode display format, selectable by the user, is provided whereby three-dimensional display area 64 is a tactical mode display format that may be changed to a second tactical display format that is an aircraft-centered side view and an aircraft-centered top view. An exemplary embodiment of such an optional embodiment is depicted in FIG. 2. FIG. 2 shows a PFD 10' according to the present invention wherein display area 64' occupies substantially the upper half of lower section 14' and the top view 66' is essentially top view display area 66 (FIG. 1) enlarged to occupy essentially the lower half of lower section 14' of PFD 10'. Three-dimensional grid 90 (FIG. 1) is displayed as two-dimensional terrain profile 90' and aircraft reference symbol 92' is shown in reference thereto. At the user's option, the two dimensional mode depicted by lower section 14' may be changed back to the three-dimensional mode at any time whereby display area 64' is returned to the three dimensional configuration as depicted in FIG. 1, reference numeral 64, and top view area 66' returns to a slice view as in depicted in FIG. 1, reference numeral 66.

Referring again to FIG. 1, three-dimensional tactical map, display, 64 shows aircraft current position as the display center and the aircraft heading as the basis angle for viewing. Grid 90 indicates the basis angle for viewing. This differs from FMS-type flight planning maps which uses waypoints as the map center. The use of waypoints as the map center, while suitable for flight planning, is not well-suited for tactical use. Waypoints, or points of interest for a given flight, are generally predefined for a given flight. As such an aircraft relative or aircraft centered three-dimensional map is needed for use as a primary flight display. The tactical mode display format with the three-dimensional tactical map may also be changed by the user to a planning mode display format. Selecting the planning mode display format changes the display from the aircraft-centered map to a waypoint-centered map. The waypoint-centered map may be used to aid in the determination of the future flight plan of the aircraft. The waypoint-centered map shows the position and future flight path of the aircraft in a three-dimensional format similar to the tactical mode display format. Aircraft reference symbol 92 in FIG. 1 is shown in the center of the display indicating the display is in the tactical mode display format. If the aircraft is on the flight path, the three-dimensional flight path 94 extends forward from the aircraft position, leaving the display space below the aircraft available to increase the situational awareness of the flight crew by providing past temporal information. This information includes the past position altitude of the aircraft. This information may be displayed by a series of vertical lines 96 rising from the grid behind the aircraft showing the position and latitude history of the aircraft. The position history lines 96 may be displayed, for example, as a series of half-intensity lines, and are preferably displayed as half-intensity green lines. This information gives the flight crew, at a glance, lateral and vertical trend information for the aircraft.

The position history lines 96 correlate to data collected at constant, predetermined time intervals. The time interval is selected to provide long term trend information rather than short term trend information. Since a constant time interval is used, aircraft speed is relatively displayed by the distance between position history lines 96. The time interval selected will generally be on the order of seconds, however, in a preferred embodiment, the time interval may be optimized to provide easily readable position history lines 96, e.g. to provide sufficient spacing between the lines, for aircrafts of different speeds. This historical information is more useful than an instantaneously computed forward pointing trend vector for increasing situational awareness.

The glide slope/localizer bracket "highway in the sky" 98, depicted by broken lines, shows when glide slope and localizer have been captured or before (as seen in FIG. 1) if there is GPS position available and the database has location of the glide slope and localizer beams. If the database has airport layout information, line drawing 100 of airport features such as runways, taxis, and the like, is shown. Airport layout information also shows up when the aircraft is on the ground. Runway and taxiway numbering, the location of hold-short lines or stop lines. Such increased situational awareness on the ground is useful in preventing incidents such as runway incursions which may result in collision or in requiring other aircraft to abort takeoffs or landings to avoid a collision. Increased situational awareness is useful where a pilot or flight crew is unfamiliar with the airport or where takeoff and landing routes are particularly intricate, and where weather conditions aircraft can obscure runway markings or other airport signage. Increased situational awareness is also useful in preventing takeoffs or attempted takeoffs from incorrect runways, which could result in collision with other aircraft. In such cases, if controllers or pilots do not become aware of the problem in time to abort a takeoff, an aircraft may attempt to takeoff on a runway that is too short. In such cases, a larger aircraft may not be able to generate the speed and lift necessary for takeoff and the aircraft could run off the end of the pavement, or if the aircraft does make it into the air, it may not be able to get high enough fast enough. The PFD according to the present invention preferably displays the airport layout and the takeoff or landing route to be used. If GPS is available, the aircraft's location on the ground and circle of error of position of aircraft is shown for ground situation awareness, and an audio and/or visual warning can be displayed to prevent a potential runway incursion.

A three-dimensional display of terrain or other obstacles 102 is also preferably depicted in the three-dimensional map area 64.

In a preferred embodiment according to the present invention, the three-dimensional map 64 is implemented as a frequency separated display. By way of background, in an article by nationally recognized aircraft display researcher Stanley Roscoe, "Airborne Displays for Flight and Navigation," he states that:

"In the preceding discussions it has been shown that pilot performance is facilitated by displays in which the symbol representing the pilot's own aircraft moves against a fixed reference system representing one or more dimensions of the outside world. It has also been shown that pilot performance is further improved when the index of desired performance, such as a target symbol or other command indication, moves independently against the same external reference system.

"The reasons for these findings seem to be intimately involved with the dynamics of the display and most specifically with the high frequency components of the display's indications. In other words, it appears that the critical consideration is that the elements of the display that respond immediately to the pilot's control inputs move in the expected direction. It appears that the direction of movement of the more slowly responding display indications is far less critical.

"This observation leads to the notion of the frequency separation principle of display which has been put forth by various people but never explicitly tested in any formal experimental program. The best known example of the frequency separation principle is the so-called 'kinalog' display system proposed by Lawrence Fogel (1959).

"Fogel demonstrated an attitude-director display system in which the initial response of the attitude presentation followed the principle of the moving part. For example, if the pilot moved his stick to the right to initiate a right turn, the aircraft symbol initially rotated clockwise. As the aircraft established its right turn, the horizon line on the display and the aircraft symbol both gradually rotated counterclockwise so that in the steady-state turn the aircraft's bank angle was indicated by a tilted horizon line. Upon rolling out of the turn, once again the first indication of the display was the counterclockwise rotation of the aircraft symbol followed more slowly by the clockwise rotation of the horizon line and aircraft symbol back to level."

The preferred implementation of the three-dimensional view in display area 64 is to have the flight management system send current aircraft location and heading at a predetermined map update rate. The display area 64, in between updates, rotates and translates the aircraft symbol only, using current values for aircraft position and heading.

When the map update occurs, the aircraft symbol is jumped back to the center of display area 64 and the three-dimensional surroundings display indicia of area 64 is slowly rotated as necessary to return viewing angle to the designated viewing angle based on the current aircraft heading, and the surroundings display indicia are correspondingly scrolled to correspond to any translational movement of the aircraft.

Figure 3:
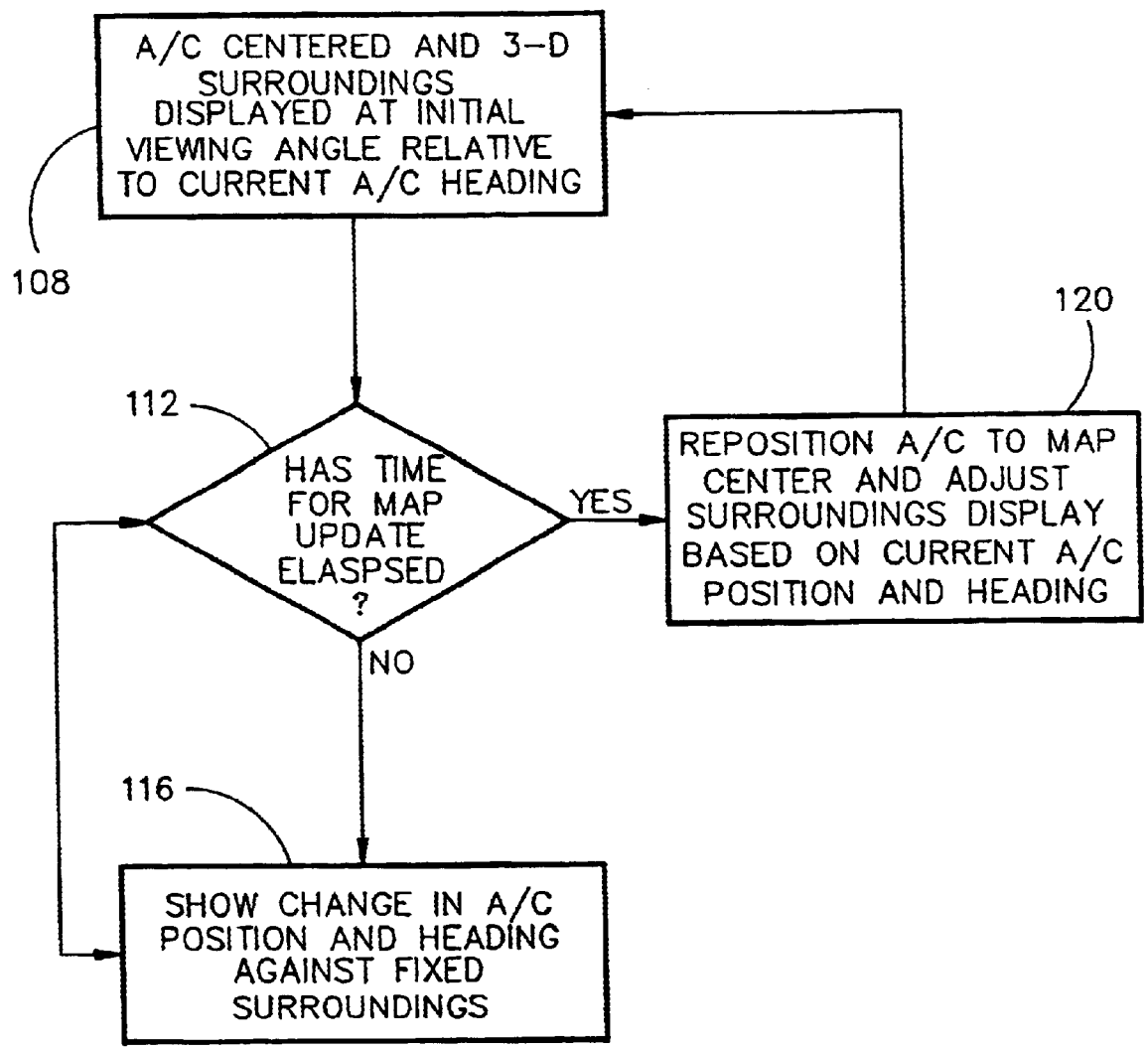
FIG. 3 shows a flowchart outlining a preferred method of updating the three-dimensional map portion of the primary flight display according to the present invention.

An algorithm for the three-dimensional frequency-separated display according to the present invention is shown in FIG. 3. In step 108, the aircraft reference symbol 92 (FIG. 1) is shown in the center of the map, and aircraft surroundings indicia, including grid 90, are displayed at a predetermined viewing angle relative to the aircraft heading.

In step 112, it is determined whether the predetermined time interval for the map update has expired. If the time period has not expired, any changes in aircraft position and heading are displayed in step 116 by adjusting the position of the aircraft reference symbol 92 on the map while the surroundings indicia remains fixed in position. In this manner, the position and heading of the aircraft are displayed and updated very frequently to provide a real-time or near real-time indication of the aircraft's movement. The algorithm then returns to step 112.

If the time period for the map update has expired, the aircraft reference symbol 92 is returned to the map center, and the surroundings indicia is scrolled and rotated in step 120 to adjust for the translational and rotational movement of the aircraft that has occurred since the previous map update.

In this manner, a frequency separated display is provided in which the immediate pilot action is reflected by a turning of the aircraft, and the heading up aspect of the map occurs at a slower rate.

The primary flight display according to the present invention may also be used in conjunction with a traffic alert and collision avoidance system (TCAS) to provide an enhanced TCAS by providing a pilot with improved situational awareness of air traffic around the pilot.

TCAS is a tactical display because it is most important when the pilot is notified of short term action the pilot must take in order to avoid a close encounter or collision. Although a three-dimensional display that simply incorporates TCAS information can provide a pilot with good situational awareness of the traffic around the pilot, it does not necessarily ensure improved pilot performance because such would not necessarily provide the pilot with a good awareness of the specific distances above and below the pilot's aircraft.

Accordingly, where the three-dimensional display according to the present invention is employed as a TCAS display, a three-dimensional presentation for situational awareness (pictorial), should be employed with other formats, shown at the same time, to provide specific distance information and tactical directions.

In a preferred embodiment according to the present invention, a three-dimensional TCAS display incorporates three parts: 1) a three-dimensional display; 2) a lateral format for use when lateral course change is needed for avoidance; and 3) a vertical format when altitude changes are needed for avoidance. This is coupled with PFD cues indicating vertical and lateral flight directions (when lateral avoidance maneuvers have been incorporated).

In the three-dimensional display area, the current position of other aircraft in the area is not enough information for the pilot to have awareness of the situation. The three-dimensional display area should also show the intended path changes of the two aircraft so that the pilot not only knows what the TCAS algorithm wants him/her to do from the PFD and two-dimensional displays, but is also provides with a three-dimensional pictorial representation of what the results will be.

The intent of the pilots of other aircraft is also important. Information about this intent can be supplied by showing trend information about the movement of the other aircraft. It is believed that this intent of the pilots of the other aircraft can best be shown by showing the past position history of the other aircraft, rather than an "instantaneous trend vector" which shows the projected path of the other aircraft if it continues on its present course. The past position history provides the kind of knowledge that a pilot would gain from observing another aircraft visually. In addition, Kalman filtering, or other statistical prediction techniques, may optionally be used to provide a projected estimate of the flight path of the other aircraft. The predicted positions and associated error may likewise be displayed in the three-dimensional display area. This does not replace the TCAS algorithms which provide warnings and suggested pilot action, but enhances the pilot's situational awareness so he/she can make better judgments.

The three-dimensional map may also be used to provide a flight crew with situational awareness with respect to other aircraft in the vicinity of the aircraft. FIG. 1 depicts an illustrative embodiment of how such information can be displayed. In FIG. 1, nearby aircraft reference symbol 104 depicts another aircraft in the area of aircraft 92, and lines 106 depict the past position history of aircraft 104.

In the future of "free flight," there will be two imaginary Elliptical solids (not shown) around the aircraft. The intent will be that the ellipsoidal solid space around any two aircraft will never intersect. Display of these elliptical airspace volumes (not shown) to the pilot is also contemplated and will serve to increase the pilot's awareness of what the automation and the ground managers (formerly air traffic controllers) are advising.

The description above should not be construed as limiting the scope of the invention, but as merely providing an illustration to some of the presently preferred embodiments of this invention. In light of the above description and examples, various other modifications and variations will now become apparent to those skilled in the art without departing from the spirit and scope of the present invention as defined by the appended claims.

What is claimed is:

1. A situational awareness-imparting display of a type and size to be used as a primary flight display for an aircraft, said display comprising:

a first display field for providing display indicia representative of airspeed, attitude, altitude, and heading of an aircraft; and a second display field for providing display indicia representative of position and flight path of an aircraft wherein said display indicia representative of position and flight path of an aircraft is shown on a three-dimensional map wherein said second display field comprises a generally rectangular and generally centrally located area for providing display indicia representative of position and flight path of an aircraft wherein said display indicia representative of position and flight path of an aircraft is formatted to give a three-dimensional illusion of depth, wherein said generally rectangular and generally centrally located area is bounded on three sides by a first view slice display area, a second view slice display area, and a third view slice display area, said first, second, and third view slice display area for providing two-dimensional display indicia representative of the position and surroundings of an aircraft relative to aircraft position and heading.

2. The situational awareness-imparting display according to claim 1, wherein the first view slice display area represents a side view of an aircraft and provides indicia representative of the airspace above and below the aircraft, wherein the second view slice display area represents a top view of the aircraft and provides indicia representative of the airspace in front of and behind the aircraft, and wherein the third view slice display area represents a top view of the aircraft and provides indicia representative of the airspace to the sides of the aircraft.

3. The situational awareness-imparting display according to claim 2 wherein said first view slice display area depicts the profile of the terrain beneath the aircraft taken along the direction of flight.

4. The situational awareness-imparting display according to claim 3 wherein one or both of said second and third view slice display areas include a indicia representative of a top view of underlying terrain.

5. The situational awareness-imparting display according to claim 2 wherein one or both of said second and third view slice display areas include a indicia representative of a top view of underlying terrain.

6. The situational awareness-imparting display according to claim 5 wherein the indicia representative of underlying terrain is color coded.

7. The situational awareness-imparting display according to claim 2 wherein said first view slice display area includes indicia representative of vertical deviation of an aircraft from a designated altitude or vertical component of a designated course, and optionally further including indicia representative of vertical deviations history obtained by sampling vertical deviation at predetermined time intervals.

8. The situational awareness-imparting display according to claim 2 wherein said third view slice display area includes indicia representative of lateral deviation of an aircraft from a designated heading or lateral component of a designated course, and optionally further including indicia representative of lateral deviation history obtained by sampling lateral deviation at predetermined time intervals.

9. The situational awareness-imparting display according to claim 2 further comprising a display area for indicia representative of autopilot status.

10. The situational awareness-imparting display according to claim 9 wherein the indicia representative of autopilot status comprises pictorial indicia.

11. An electronic, moving, aircraft-centered map for imparting situational awareness to a flight crew of an aircraft and for aiding tactical decision making during a flight, said map comprising display indicia representative of position and flight path of an aircraft wherein said display indicia representative of position and flight path of an aircraft is formatted to give a three-dimensional illusion of depth; and one or more display indicia selected from the group consisting of designated course information, past position history of the aircraft, and potential threats to the aircraft;

wherein the flight path indicia is selected from indicia representing one or more of the group consisting of: a predetermined flight plan; landing approach information; a flight path change required by ground control; a flight path change requested by a flight crew; a flight path change intended to avoid a potential collision with other aircraft; a flight path change intended to avoid potential flight into terrain; and a flight path change intended to avoid severe weather wherein said designated course information comprises a lateral heading component and optionally a component designating an angle in the vertical plane, and wherein said designated course information indicia is formatted to give a three-dimensional illusion of depth.

12. The aircraft-centered map according to claim 11 wherein said indicia representing a flight path change intended to avoid a potential collision with other aircraft is employed in conjunction with a traffic alert and collision avoidance system.

13. The aircraft-centered map according to claim 11 wherein said indicia representing a flight path change intended to avoid potential flight into terrain is employed in conjunction with a ground collision avoidance system or ground proximity warning system.

14. The aircraft-centered map according to claim 11 wherein said indicia representing landing approach information is employed in conjunction with an instrument landing system.

15. A flight management system comprising a three-dimensional map capable of being rendered on an electronic display, said three-dimensional map comprising a plurality of modes, said plurality of modes comprising:

a tactical mode display format, said tactical mode display format comprising an electronic, moving, aircraft-centered map for imparting situational awareness to a flight crew of an aircraft and for aiding tactical decision making during a flight, said aircraft-centered map comprising display indicia representative of position and flight path of an aircraft, wherein said display indicia representative of position and flight path of an aircraft is formatted to give a three-dimensional illusion of depth; and a planning mode display format, wherein said planning mode display format comprises an electronic, moving, waypoint-centered map for aiding in the determination of the future flight plan of an aircraft, said waypoint-centered map comprising indicia representative of position and future flight plan of an aircraft, wherein said display indicia representative of position and future flight path of an aircraft is formatted to give a three-dimensional illusion of depth.

wherein each of said plurality of modes is selectable by a user.

16. The flight management system according to claim 15 further comprising a second tactical mode display format comprising an aircraft-centered top view and an aircraft-centered side view.

17. A method of displaying an electronic, aircraft-centered, moving map in a display area, said map comprising aircraft reference indicia and aircraft surroundings indicia representative of the surroundings of the aircraft, said surroundings of the aircraft comprising airspace and terrestrial features, said aircraft reference indicia being displayed to show the position of an aircraft with respect to its surroundings, said method comprising:

providing an initial viewing format wherein the aircraft reference symbol is depicted in a predetermined initial position on the display area, and the aircraft surroundings indicia are formatted to give a three-dimensional illusion of depth and are depicted at a predetermined viewing angle with respect to the direction of flight of the aircraft;

moving the aircraft reference indicia in the display area to represent changes in position and course of the aircraft, said aircraft surroundings indicia and said predetermined viewing angle remaining stationary, to provide substantially continuous and substantially immediate updates of position and course of the aircraft;

providing a map update rate comprising a predetermined time interval whereupon the map is returned to the initial viewing format only upon the expiration of the predetermined time interval;

upon expiration of the predetermined time interval, returning the map to the initial viewing format by jumping the aircraft symbol back to said initial position and slowly scrolling and/or rotating the aircraft surroundings indicia to said predetermined viewing angle, wherein said initial position and predetermined viewing angle are determined based on the present position and course of the aircraft.

18. The method according to claim 17 wherein said initial position is located of said viewing area.

19. The method according to claim 17 wherein said viewing area is a portion of a primary flight display, said primary flight display further comprising indicia representing one or more of the following selected from the group consisting of: air speed altitude, altitude, and heading.

20. The method according to claim 17 wherein said aircraft surroundings indicia further comprises future flight plan indicia.

* * * * *